US012570843B2

(12) United States Patent　　(10) Patent No.: US 12,570,843 B2
Lee et al.　　(45) Date of Patent: Mar. 10, 2026

(54) SEMI-CONDUCTIVE COMPOUND COMPOSITION AND METHOD FOR PREPARING SAME

(71) Applicant: HANWHA SOLUTIONS CORPORATION, Seoul (KR)

(72) Inventors: In Jun Lee, Daejeon (KR); Jae Yun Lim, Daejeon (KR); Jeong Hyun Park, Daejeon (KR)

(73) Assignee: HANWHA SOLUTIONS CORPORATION, Seoul (KR)

( * ) Notice: Subject to any disclaimer, the term of this patent is extended or adjusted under 35 U.S.C. 154(b) by 0 days.

(21) Appl. No.: 18/862,177

(22) PCT Filed: May 2, 2023

(86) PCT No.: PCT/KR2023/005954
§ 371 (c)(1),
(2) Date: Nov. 1, 2024

(87) PCT Pub. No.: WO2023/214764
PCT Pub. Date: Nov. 9, 2023

(65) Prior Publication Data
US 2025/0297086 A1　　Sep. 25, 2025

(30) Foreign Application Priority Data
May 3, 2022　(KR) ........................ 10-2022-0054816

(51) Int. Cl.
| *C08L 23/0869* | (2025.01) |
| *C08J 3/22* | (2006.01) |
| *C08J 3/24* | (2006.01) |
| *C08K 3/04* | (2006.01) |
| *C08K 5/098* | (2006.01) |
| *H01B 1/18* | (2006.01) |
| *H01B 1/24* | (2006.01) |

(52) U.S. Cl.
CPC ........... *C08L 23/0869* (2013.01); *C08J 3/226* (2013.01); *C08J 3/24* (2013.01); *C08K 3/04* (2013.01); *C08K 5/098* (2013.01); *H01B 1/18* (2013.01); *H01B 1/24* (2013.01); *C08J 2323/08* (2013.01); *C08J 2423/08* (2013.01); *C08K 2201/001* (2013.01); *C08L 2201/08* (2013.01); *C08L 2203/202* (2013.01); *C08L*
2205/025 (2013.01); *C08L 2310/00* (2013.01); *C08L 2312/00* (2013.01)

(58) Field of Classification Search
CPC .... C08J 3/226; C08J 2323/08; C08J 2423/08; C08L 23/0869; C08L 2205/025; H01B 1/18; H01B 1/24
USPC ........................................................ 252/511
See application file for complete search history.

(56) References Cited

U.S. PATENT DOCUMENTS

| 2008/0283273 A1 * | 11/2008 | Nam ........................ H01B 1/24 |
| | | 524/69 |
| 2019/0180889 A1 * | 6/2019 | Yang ................... C08L 23/0869 |
| 2023/0033608 A1 * | 2/2023 | Lee ........................... C08K 5/14 |
| 2023/0174740 A1 * | 6/2023 | Gkourmpis ............ C08K 3/042 |
| | | 428/375 |

FOREIGN PATENT DOCUMENTS

| JP | H01118552 A | 5/1989 |
| KR | 100522196 B1 * | 10/2005 |
| KR | 20060111019 A | 10/2006 |
| KR | 20110035536 A | 4/2011 |
| KR | 20140112063 A | 9/2014 |
| KR | 20150124779 A * | 11/2015 ............. C08L 23/04 |
| KR | 20190015116 A | 2/2019 |
| KR | 20210080935 A | 7/2021 |
| KR | 20210080939 A | 7/2021 |
| TW | 202130673 A | 8/2021 |

OTHER PUBLICATIONS

Translation of KR-100522196-B1 (Year: 2005).*
Translation of KR20150124779A (Year: 2015).*
TW 11221238950 OA.
Office Action from Japanese Patent Office dated Jan. 26, 2026 Issued for Japanese Patent Application No. 2024-564838.

* cited by examiner

*Primary Examiner* — Tri V Nguyen
(74) *Attorney, Agent, or Firm* — Harvest IP Law, LLP

(57) ABSTRACT

The present invention relates to a semiconducting compound composition and a method of preparing the same. More particularly, the present invention relates to a semiconducting compound composition containing: a base resin obtained by mixing two types of ethylene butyl acrylate resins having different melt indices; and carbon black, wherein a volume of the carbon black in the semiconducting compound composition is 60 vol % or more of the total composition volume, and a method of preparing the same.

13 Claims, No Drawings

SEMI-CONDUCTIVE COMPOUND COMPOSITION AND METHOD FOR PREPARING SAME

CROSS-REFERENCE TO RELATED APPLICATION(S)

This application is a National Stage of International Application No. PCT/KR2023/005954 filed on May 2, 2023, claiming priority based on Korean Patent Application No. 10-2022-0054816 filed on May 3, 2022, the disclosure of which is incorporated herein by reference in its entirety.

TECHNICAL FIELD

The present invention relates to a semiconducting compound composition and a method of preparing the same. More particularly, the present invention relates to a semiconducting compound composition for a high-voltage power cable having excellent processability and a low volume resistance even at a high temperature, and a method of preparing the same.

BACKGROUND ART

In general, a power cable includes a conductor formed of a metal such as aluminum or copper, an inner semiconducting layer covering the conductor, an insulating layer covering the inner semiconducting layer, an outer semiconducting layer, an outer layer disposed on an outer surface of the outer semiconducting layer to protect the outer semiconducting layer and the cable itself, and the like, and a structure thereof may be changed as needed.

Since a high voltage may be applied to the insulating layer due to an electric field distortion that may occur between the conductor and the neutral wire, the semiconducting layer is used to radially uniform a local electric field and to prevent insulation breakdown and shortening of the life of the power cable caused by deterioration of the insulating layer.

The semiconducting layer is manufactured by mixing carbon black in an amount sufficient to become semiconducting, and a common crosslinking agent with an ethylene resin such as an ethylene vinyl acetate resin (EVA) and an ethylene butyl acrylate (EBA) resin in order to faithfully play its natural role in constituting a power cable.

A volume resistance of the semiconducting layer increases as the temperature rises, which means that a conductive network of the semiconducting material is destroyed at a high temperature, and thus, a flow of electrons is suppressed, resulting in an increase of volume resistance value.

In order to maximize a decrease in the volume resistance value, a content of the semiconducting material such as carbon black may be increased, which may cause deterioration of processability, mechanical strength, or the like.

In order to improve the processability, different types of polymer resins may be mixed and used or a crosslinking agent may be further added, but miscibility may be reduced or the volume resistance may be increased.

Therefore, in the art, there is an urgent need for development of a semiconducting compound composition for forming a semiconducting layer having excellent processability and mechanical strength and a low volume resistance even at a high temperature.

RELATED ART DOCUMENT

Patent Document (Patent Document 1) Korea Patent Laid-open Publication No. 10-2019-0015116 (Feb. 13, 2019)

DISCLOSURE

Technical Problem

An embodiment of the present invention is directed to providing a semiconducting compound composition having a low volume resistance even at a high temperature and excellent processing stability.

Another embodiment of the present invention is directed to providing a semiconducting compound composition having excellent oxidative stability even at a high temperature.

Technical Solution

In one general aspect, a semiconducting compound composition contains: a base resin obtained by mixing two types of ethylene butyl acrylate resins having different melt indices; and carbon black, wherein a content of the carbon black satisfies the following Expression 1:

$$\frac{(M_1/d_1)}{(M_1/d_1 + M_2/d_2)} \times 100 \geq 60\% \qquad \text{[Expression 1]}$$

wherein $M_1$ is a weight of the carbon black, $M_2$ is a weight of the base resin, $d_1$ is a specific gravity of the carbon black, and $d_2$ is a specific gravity of the base resin.

According to an exemplary embodiment of the present invention, the melt indices may satisfy the following Expressions 2 and 3:

$$1 \leq MI_1 \leq 10 \qquad \text{[Expression 2]}$$

$$11 \leq MI_2 \leq 30 \qquad \text{[Expression 3]}$$

wherein $MI_1$ is a melt index of a first ethylene butyl acrylate resin, $MI_2$ is a melt index of a second ethylene butyl acrylate resin, the melt index is measured under conditions of 125° C. and 2.16 kg according to the ASTM D1238 measurement method, and a unit of the melt index is g/10 min.

According to an exemplary embodiment of the present invention, in the base resin, $MI_1$ of the first ethylene butyl acrylate resin may be 5 to 10 g/10 min, and $MI_2$ of the second ethylene butyl acrylate resin may be 15 to 25 g/10 min.

According to an exemplary embodiment of the present invention, $MI_1$ and $MI_2$ of the base resin may satisfy the following Expression 4:

$$10 \leq MI_2 - MI_1 \leq 20 \qquad \text{[Expression 4]}$$

wherein $MI_1$ is the melt index (g/10 min) of the first ethylene butyl acrylate resin measured under conditions of 125° C. and 2.16 kg according to the ASTM D1238 measurement method, and $MI_2$ is the melt index (g/10 min) of the second ethylene butyl acrylate resin measured by the same measurement method as described above.

According to an exemplary embodiment of the present invention, in the base resin, the first ethylene butyl acrylate resin may be an ethylene butyl acrylate resin having a content of a structural unit derived from a butyl acrylate monomer of 15 to 18 mol % and having $MI_1$ of 5 to 10 g/10 min, and the second ethylene butyl acrylate resin may be an ethylene butyl acrylate resin having a content of a structural unit derived from a butyl acrylate monomer of 19 to 22 mol % and having $MI_2$ of 17 to 22 g/10 min.

According to an exemplary embodiment of the present invention, the carbon black may be contained in an amount of 30 to 100 parts by weight with respect to 100 parts by weight of the base resin.

According to an exemplary embodiment of the present invention, the semiconducting compound composition may further contain an antioxidant and a crosslinking agent.

According to an exemplary embodiment of the present invention, the carbon black, the antioxidant, and the crosslinking agent may be contained in amounts of 30 to 100 parts by weight, 0.01 to 5 parts by weight, and 0.1 to 10 parts by weight, respectively, with respect to 100 parts by weight of the base resin.

According to an exemplary embodiment of the present invention, the semiconducting compound composition may further contain a metal stearate.

According to an exemplary embodiment of the present invention, the metal stearate may include one or a combination of two or more selected from the group consisting of zinc stearate, calcium stearate, aluminum stearate, and magnesium stearate.

In another general aspect, there is provided a semiconducting resin cured product obtained by crosslinking the semiconducting compound composition.

According to an exemplary embodiment of the present invention, the semiconducting resin cured product may have a volume resistance of 330 Ω·cm or less when measured at 135° C. according to ASTM D991.

In still another general aspect, a method of preparing a semiconducting resin cured product includes: a) adding a base resin, carbon black, and an antioxidant to a first kneader and then performing kneading and crushing to prepare master batch particles; b) mixing the master batch particles and a crosslinking agent so that the master batch particles are impregnated with the crosslinking agent to prepare a semiconducting compound composition; and c) homogenizing the semiconducting compound composition to provide a semiconducting resin cured product, wherein a content of the carbon black in the semiconducting compound composition satisfies the following Expression 1:

$$\frac{(M_1/d_1)}{(M_1/d_1 + M_2/d_2)} \times 100 \geq 60\% \qquad \text{[Expression 1]}$$

wherein $M_1$ is a weight of the carbon black, $M_2$ is a weight of the base resin, $d_1$ is a specific gravity of the carbon black, and $d_2$ is a specific gravity of the base resin.

According to an exemplary embodiment of the present invention, the carbon black, the antioxidant, and the crosslinking agent may be contained in amounts of 30 to 100 parts by weight, 0.01 to 5 parts by weight, and 0.1 to 10 parts by weight, respectively, with respect to 100 parts by weight of the base resin.

Advantageous Effects

As set forth above, the semiconducting resin cured product prepared using the semiconducting compound composition of the present invention has a volume resistance of 200 Ω·cm or less, 180 Ω·cm or less, or 160Ω or less, and more preferably 150 Ω·cm or less, at a high temperature, for example, 90° C., and has a long scorch time, such that the semiconducting resin cured product has excellent processability and surface smoothness.

Further, the semiconducting resin cured product of the present invention has excellent oxidative stability even at a high temperature, such that the semiconducting resin cured product has excellent durability even when used for a long time and may maintain a low volume resistance.

BEST MODE

Hereinafter, the present invention will be described in more detail through specific examples or exemplary embodiments. However, each of the following specific examples or exemplary embodiments is merely one reference example for describing the present invention in detail, and the present invention is not limited thereto and may be implemented in various forms.

In addition, unless otherwise defined, all the technical terms and scientific terms have the same meanings as commonly understood by those skilled in the art to which the present invention pertains. The terms used in the description of the present invention are merely used to effectively describe a specific exemplary embodiment, but are not intended to limit the present invention.

In addition, unless the context clearly indicates otherwise, singular forms used in the specification and the scope of the appended claims are intended to include plural forms.

In addition, unless explicitly described to the contrary, "comprising" any components will be understood to imply further inclusion of other components rather than the exclusion of any other components.

A semiconducting layer included in a high-voltage cable requires a low volume resistance and excellent processability. The semiconducting layer is manufactured by mixing a polymer resin and a conductive material, and physical properties of a semiconducting compound composition are changed depending on a content of the conductive material, and accordingly, the content of the conductive material needs to be controlled to be optimal.

The present invention provides a semiconducting compound composition containing: a base resin obtained by mixing two types of ethylene butyl acrylate resins having different melt indices; and carbon black, wherein a volume of the carbon black in the semiconducting compound composition is 60 vol % or more of the total composition volume, such that the above problems are solved.

Specifically, the semiconducting compound composition in which a base resin obtained by mixing two types of ethylene butyl acrylate resins having different melt indices and carbon black are mixed has excellent processability and a low volume resistance, in particular, when a volume of the carbon black is 60 vol % or more, for example, 61 vol % to 70 vol %, of the total volume of the semiconducting compound composition, the semiconducting compound composition may have a lower volume resistance even at a high temperature and excellent processability, and the physical properties of the semiconducting compound composition are excellent even when contents of a crosslinking agent and an antioxidant are reduced.

More particularly, the present invention provides a semiconducting compound composition containing: a base resin obtained by mixing two types of ethylene butyl acrylate resins having different melt indices; and carbon black, wherein a content of the carbon black satisfies the following Expression 1:

$$\frac{(M_1/d_1)}{(M_1/d_1 + M_2/d_2)} \times 100 \ge 60\% \qquad \text{[Expression 1]}$$

wherein $M_1$ is a weight of the carbon black, $M_2$ is a weight of the base resin, $d_1$ is a specific gravity of the carbon black, and $d_2$ is a specific gravity of the base resin.

As shown in Expression 1, the volume of the carbon black may be 60 vol % or more of the total volume of the semiconducting compound composition, and specifically, the volume of the carbon black may be 61 to 70 vol %, and specifically 62 to 68 vol %, but is not limited thereto. As the content of the carbon black in the semiconducting compound composition satisfies the above content, the semiconducting compound composition may have a lower volume resistance even at a high temperature and excellent processability, and may have excellent physical properties even when the contents of the crosslinking agent and the antioxidant are reduced.

According to an exemplary embodiment of the present invention, in the semiconducting compound composition, the carbon black may be contained in an amount of 30 to 100 parts by weight with respect to 100 parts by weight of the base resin, specifically, the carbon black may be contained in an amount of 40 to 90 parts by weight with respect to 100 parts by weight of the base resin, more specifically, the carbon black may be contained in an amount of 55 to 70 parts by weight with respect to 100 parts by weight of the base resin, and more specifically, the carbon black may be contained in an amount of 55 to 60 parts by weight with respect to 100 parts by weight of the base resin, but the content of the carbon black is not limited thereto.

According to an exemplary embodiment of the present invention, the melt indices of the two types of ethylene butyl acrylate resins having different melt indices may satisfy the following Expressions 2 and 3:

$$1 \le MI_1 \le 10 \qquad \text{[Expression 2]}$$

$$11 \le MI_2 \le 30 \qquad \text{[Expression 3]}$$

wherein $MI_1$ is a melt index of a first ethylene butyl acrylate resin, $MI_2$ is a melt index of a second ethylene butyl acrylate resin, the melt index is measured under conditions of 125° C. and 2.16 kg according to the ASTM D1238 measurement method, and a unit of the melt index is g/10 min.

As the base resin contained in the semiconducting compound composition contains a mixture of the first ethylene butyl acrylate resin satisfying the melt index value in the range of $MI_1$ and the second ethylene butyl acrylate resin satisfying the melt index value in the range of $MI_2$, the semiconducting compound composition has further improved processability and has also excellent miscibility between the components. In addition, the present inventors have found that, in the case of the semiconducting compound composition containing the base resin, the volume resistance was significantly lower than that of a resin containing one type of ethylene butyl acrylate or a resin obtained by mixing two different types of polymer resins.

In addition, the present inventors recognized for the first time that the volume resistance of the semiconducting compound composition could be decreased without deterioration of the original processability and mechanical properties of the semiconducting compound composition by adopting the base resin containing the first ethylene butyl acrylate resin and the second ethylene butyl acrylate resin satisfying Expressions 2 and 3, thereby completing the present invention.

In addition, according to an exemplary embodiment of the present invention, a base resin having $MI_1$ of 5 to 10 g/10 min and $MI_2$ of 15 to 25 g/10 min and satisfying Expression 3 is more preferred because the volume resistance may be further decreased.

In addition, according to an exemplary embodiment of the present invention, $MI_1$ and $MI_2$ of the base resin satisfy the following Expression 4, such that a volume resistance at a high temperature may be further decreased, which is more preferred.

$$10 \le MI_2 - MI_1 \le 20 \qquad \text{[Expression 4]}$$

In an exemplary embodiment of the present invention, in the base resin, the first ethylene butyl acrylate resin may be an ethylene butyl acrylate resin having a content of a structural unit derived from a butyl acrylate monomer of 15 to 18 mol % and having a melt index of 5 to 10 g/10 min, the second ethylene butyl acrylate resin may be an ethylene butyl acrylate resin having a content of a structural unit derived from a butyl acrylate monomer of 19 to 22 mol % and having a melt index of 17 to 22 g/10 min, and when the base resin obtained by mixing these resins is adopted, it is possible to provide a semiconducting compound composition having a lower volume resistance at a high temperature, which is more preferred.

According to an exemplary embodiment of the present invention, the semiconducting compound composition may further contain an antioxidant and a crosslinking agent.

The semiconducting compound composition contains the antioxidant, such that an excellent volume resistance at a high temperature, processability, and mechanical strength of the semiconducting compound composition may be maintained, and deterioration of the semiconducting compound composition may be suppressed for a long time after processing.

The antioxidant according to an exemplary embodiment of the present invention may be one or more selected from the group consisting of a phenolic compound and a thioether-based compound.

Specifically, the phenolic compound may include, but is not limited to, one or a combination of two or more selected from the group consisting of 2,2'-thiodiethylene bis(3,5-di-t-butyl-4-hydroxyphenyl)propionate, 4,4'-thiobis(2-t-butyl-5-methylphenol), 1,2-dihydro-2,2,4-trimethylquinoline, diethyl((3,5-bis(1,1-dimethylethyl)-4-hydroxyphenyl) methyl) phosphonate, 1,3,4-tris(4-tert-butyl-3-hydroxy-2,6-dimethylbenzene)-1,3,5-triazine-2,4,6-(1H,3H,5H)-trione, tetrakis[methylene-3-(3,5-di-tert-butyl-4-hydroxyphenyl) propionate]methane, octadecyl 3-(3,5-di-tert-butyl-4-hydroxyphenyl)propionate, tris(2,4-di-tert-butylphenyl)phosphite, and N,N'-bis(3-(3',5'-di-t-butyl-4'-hydroxyphenyl) propionyl)hydrazine.

In addition, the thioether-based compound may include, but is not limited to, one or a combination of two or more of dilauryl thiodipropionate, ditridecyl thiodipropionate, dimyristyl thiodipropionate, dioctadecyl disulfide, bis[2-methyl-4-(3-n-dodecylthiopropionyloxy)-5-tert-butylphenyl]sulfide, pentaerythritol tetrakis(3-laurylthiopropionate), 1,4-cyclohexanedimethanol, a 3,3'-thiobispropanoic acid dimethyl ester polymer, and distearyl thiodipropionate.

As the semiconducting compound composition is processed using the antioxidant, processability of the polymer may be increased, and polymer oxidation may be prevented.

The semiconducting compound composition contains a crosslinking agent, and a crosslinked semiconducting layer may be formed by press-molding, injection-molding, or extrusion-molding the composition containing a crosslinking agent at a high temperature, for example, a high temperature of 180° C. or higher or 200° C. or higher. A method of uniformly impregnating the master batch particles with the crosslinking agent is not particularly limited, and for example, the master batch particles and the crosslinking agent are mixed, heated, and aged to realize uniformity.

Examples of the crosslinking agent that may be suitably used include di(tert-butylperoxyisopropyl)benzene, 1,1-(tert-butylperoxy)-3,3,5-trimethylcyclohexane, normal-butyl-4,4-(bis-butylperoxy)valerate, dicumyl peroxide, perbutyl peroxide, 1,1-bis(tert-butylperoxy)-diisopropylbenzene, benzoyl peroxide, 2,5-dimethyl-2,5-di-tert-butylperoxyhexane, tert-butyl peroxybenzoate, di-tert-butyl peroxide, and 2,5-dimethyl-2,5-di-tert-butylperoxylhexane, specifically, include one or a combination of two or more selected from the group consisting of perbutyl peroxide, 1,1-(tert-butylperoxy)-3,3,5-trimethylcyclohexane, benzoyl peroxide, and dicumyl peroxide, and more specifically, include dicumyl peroxide and perbutyl peroxide, but are not limited thereto.

According to an exemplary embodiment of the present invention, in the semiconducting compound composition, the carbon black, the antioxidant, and the crosslinking agent may be contained in amounts of 30 to 100 parts by weight, 0.01 to 5 parts by weight, and 0.1 to 10 parts by weight, respectively, with respect to 100 parts by weight of the base resin, specifically, the carbon black, the antioxidant, and the crosslinking agent may be contained in amounts of 40 to 90 parts by weight, 0.1 to 3 parts by weight, and 0.3 to 5 parts by weight, respectively, with respect to 100 parts by weight of the base resin, and more specifically, the carbon black, the antioxidant, and the crosslinking agent may be contained in amounts of 55 to 70 parts by weight, 0.2 to 1 part by weight, and 0.5 to 3 parts by weight, respectively, with respect to 100 parts by weight of the base resin, but are not limited thereto.

As the contents of the components in the semiconducting compound composition satisfy the above ranges, a crosslinking time and a degree of crosslinking may be appropriately set, and as a result, it is possible to provide a semiconducting compound composition having excellent processability and mechanical strength and having an excellent volume resistance without a change even when used for a long time.

In addition, according to an exemplary embodiment of the present invention, the semiconducting compound composition may further contain a metal stearate-based compound and the like, and specifically, the metal stearate-based compound may include one or a combination of two or more selected from the group consisting of zinc stearate, calcium stearate, aluminum stearate, and magnesium stearate, specifically, may include calcium stearate and/or zinc stearate, and more specifically, may include zinc stearate, but is not limited thereto.

As the metal stearate is further contained, a sloughing phenomenon of the polymer may be minimized. The semiconducting layer manufactured using the metal stearate according to an exemplary embodiment of the present invention does not have protrusions of a surface thereof, and may have excellent surface characteristics. In addition, as the metal stearate is further contained, when the semiconducting compound composition is molded after improving fluidity thereof, an electrical conductivity deviation due to stretching may be minimized.

In addition, according to an exemplary embodiment of the present invention, the semiconducting compound composition may further contain a processing aid. The processing aid may include one or a combination of two or more selected from the group consisting of montan wax, a fatty acid ester, a triglyceride or a partial ester thereof, a glycerin ester, polyethylene wax, paraffin wax, a metal soap-based lubricant, and an amide-based lubricant, and specifically, a fatty acid ester, a triglyceride or a partial ester thereof, and polyethylene wax, but is not limited thereto.

As the processing aid is further contained, an effect of improving releasability between the semiconducting compound composition and the conductor and lowering an extrusion load may be realized. A semiconducting resin cured product may be prepared by crosslinking the semiconducting compound composition according to an exemplary embodiment of the present invention. The crosslinked semiconducting resin cured product has excellent processability and mechanical properties and an excellent volume resistance even at a high temperature, and thus is suitable for use in a semiconducting layer of an ultra-high voltage cable wire.

Factors of the semiconducting resin cured product, such as mechanical properties and a volume resistance, may be changed depending on a degree of crosslinking, and the degree of crosslinking may be determined by a crosslinking density.

According to an exemplary embodiment of the present invention, the semiconducting resin cured product may have a volume resistance of 300 Ω·cm or less, specifically, 160 Ω·cm or less, and more specifically, 150 Ω·cm or less, when measured at 90° C. according to ASTM D991, but is not limited thereto.

In addition, the semiconducting resin cured product may have a volume resistance of 340 Ω·cm or less, specifically, 300 Ω·cm or less, and more specifically, 250 Ω·cm or less, when measured at 110° C. according to ASTM D991, but is not limited thereto.

In addition, the semiconducting resin cured product may have a volume resistance of 330 Ω·cm or less, specifically, 300 Ω·cm or less, and more specifically, 250 Ω·cm or less, when measured at 135° C. according to ASTM D991, but is not limited thereto.

In addition, the semiconducting resin cured product may have an elongation of 180% or more, specifically, 180% to 200%, and more specifically, 185% to 195%, when measured according to ASTM D638, but is not limited thereto.

In addition, the semiconducting resin cured product may have a tensile strength of 220 kgf/cm$^2$ or more, specifically, 230 to 300 kgf/cm², and more specifically, 230 to 270 kgf/cm², when measured according to ASTM D638, but is not limited thereto.

According to an exemplary embodiment of the present invention, it is possible to provide a method of preparing a semiconducting resin cured product, the method including: a) adding a base resin, carbon black, and an antioxidant to a first kneader and then performing kneading and crushing to prepare master batch particles; b) mixing the master batch particles and a crosslinking agent so that the master batch particles are impregnated with the crosslinking agent to prepare a semiconducting compound composition; and c) homogenizing the semiconducting compound composition to provide a semiconducting resin cured product, wherein a content of the carbon black in the semiconducting compound composition satisfies the following Expression 1:

$$\frac{(M_1/d_1)}{(M_1/d_1 + M_2/d_2)} \times 100 \geq 60\% \qquad \text{[Expression 1]}$$

wherein $M_1$ is a weight of the carbon black, $M_2$ is a weight of the base resin, $d_1$ is a specific gravity of the carbon black, and $d_2$ is a specific gravity of the base resin.

A temperature of the first kneader in the step a) may be 90 to 120° C., but is not limited thereto as long as it is a commonly used temperature. A Banbury mixer (dispersion type kneader) or the like may be used as the kneader, but the kneader is not limited thereto as long as it is a commonly used equipment.

In the step a), a composite resin kneaded in the kneader may be prepared in a form of master batch particles for smooth processing, the master batch particles may be prepared after passing through a roll mill and a crusher, and the equipment is not limited thereto as long as it is a commonly used equipment.

A size of the master batch particle may be 2 to 10 mm, and specifically, 3 to 8 mm, but is not limited thereto.

The b) step may include mixing the master batch particles and the crosslinking agent, and a Brabender mixer may be used for the mixing, but is not limited thereto. As for the mixing conditions, the kneading may be performed at 60 to 80° C. at a stirring rate of 30 to 60 rpm, but is not limited thereto. As the master batch particles are mixed with the crosslinking agent, it is possible to prepare a semiconducting compound composition in a form in which the master batch particles are impregnated with the crosslinking agent.

In the step c), the prepared semiconducting compound composition may be homogenized, and specifically, may be homogenized in an oven. The homogenization means that, as the crosslinking agent permeates into the particles, the composition is homogenized so that there is no variation in physical properties due to press molding.

A temperature of the oven may be a temperature higher than a curing temperature of a curing agent, and specifically, may be 60 to 100° C., and a crosslinking and aging time may be 10 minutes to 12 hours, but the present invention is not limited thereto.

In addition, according to an exemplary embodiment of the present invention, the crosslinking time in the step c) may be 10 minutes or longer, and specifically, 12 minutes or longer, but is not limited thereto. When the crosslinking time is too short, the processing stability of the semiconducting resin cured product may be deteriorated during cable processing.

Hereinafter, the present invention will be described in more detail with reference to Examples and Comparative Examples. However, the following Examples and Comparative Examples are only examples for describing the present invention in more detail, and the present invention is not limited by the following Examples and Comparative Examples.

[Tensile Strength and Elongation]

A tensile strength and an elongation were measured under a condition of 250 mm/min according to ASTM D638.

[Scorch Time]

A scorch time was measured according to ASTM D6204.

[Volume Resistance]

A volume resistance was measured according to ASTM D991.

[Melt Index]

A melt index was measured under conditions of 125° C. and 2.16 kg according to the ASTM D1238 measurement method, and a unit of the melt index was g/10 min.

Example 1

0.635 parts by weight of 1,2-dihydro-2,2,4-trimethylqui-noline (Naugard SuperQ, Miwon Corporation) and 56.5 parts by weight of carbon black (420B, bulk density: 0.308 g/ml) were mixed with 100 parts by weight of a base resin containing a first ethylene butyl acrylate resin having a butyl acrylate content of 17 mol %, a density of 0.924 g/ml and a melt index of 7.0 g/10 min and a second ethylene butyl acrylate resin having a butyl acrylate content of 20 mol %, a density of 0.925 g/ml, and a melt index of 20.0 g/10 min at the same weight ratio, the mixture was kneaded at 100° C. for 30 minutes with a roll mill, and the kneaded product was crushed into particles having a size of 2 to 4 mm by passing the kneaded product through a crusher. Subsequently, the crushed particles and a crosslinking agent were added to a Brabender mixer, the particles were impregnated with the crosslinking agent, and then aging was performed, thereby preparing semiconducting compound composition particles with which a crosslinking agent was impregnated. To the Brabender mixer, di(tert-butylperoxyisopropyl)benzene as a crosslinking agent was added in an amount of 1.25 parts by weight with respect to 100 parts by weight of the base resin, mixing and impregnation were performed at 75° C. and 40 rpm for 10 minutes, and then aging was performed in an oven at 70° C. for 8 hours, thereby preparing semiconducting compound composition particles with which a crosslinking agent was uniformly impregnated.

The semiconducting compound composition particles were press-molded at 180° C. and 200 bar to prepare a specimen for measuring physical properties. The tensile strength, the elongation, and the scorch time were measured, and the results thereof were shown in Table 1. The volume resistance was measured and the results thereof were shown in Table 2.

Example 2

A procedure was performed in the same manner as that of Example 1, except that 55.36 parts by weight of carbon black (2700G, bulk density: 0.299 g/ml) was used instead of carbon black (420B, bulk density: 0.308 g/ml), and 0.63 parts by weight of 1,2-dihydro-2,2,4-trimethylquinoline (Naugard SuperQ, Miwon Corporation) and 1.24 parts by weight of di(tert-butylperoxyisopropyl)benzene as a crosslinking agent (Perkadox14s-FL, AkzoNobel) were used.

The tensile strength, the elongation, and the scorch time of the prepared semiconducting compound composition were measured and the results were shown in Table 1. The volume resistance of the semiconducting compound composition was measured and the results were shown in Table 2.

Example 3

A procedure was performed in the same manner as that of Example 1, except that 55.85 parts by weight of carbon black (XC500, bulk density: 0.314 g/ml) was used instead of carbon black (420B, bulk density: 0.308 g/ml), and 0.63 parts by weight of 1,2-dihydro-2,2,4-trimethylquinoline (Naugard SuperQ, Miwon Corporation) and 2.49 parts by weight of di(tert-butylperoxyisopropyl)benzene as a cross-linking agent (Perkadox14s-FL, AkzoNobel) were used.

The tensile strength, the elongation, and the scorch time of the prepared semiconducting compound composition were measured and the results were shown in Table 1. The volume resistance of the semiconducting compound composition was measured and the results were shown in Table 2.

Comparative Example 1

A procedure was performed in the same manner as that of Example 3, except that 55.85 parts by weight of carbon black (XC500, bulk density: 0.347 g/ml) was used instead of carbon black (XC500, bulk density: 0.314 g/ml). The tensile strength, the elongation, and the scorch time of the prepared semiconducting compound composition were measured and the results were shown in Table 1. The volume resistance of the semiconducting compound composition was measured and the results were shown in Table 2.

Comparative Example 2

A procedure was performed in the same manner as that of Example 1, except that, 100 parts by weight of a single resin, a first ethylene butyl acrylate resin having a butyl acrylate content of 17 mol %, a density of 0.924 g/ml, and a melt index of 7.0 g/10 min, was used as a base resin, instead of the mixed base resin containing a first ethylene butyl acrylate resin having a butyl acrylate content of 17 mol %, a density of 0.924 g/ml, and a melt index of 7.0 g/10 min and a second ethylene butyl acrylate resin having a butyl acrylate content of 20 mol %, a density of 0.925 g/ml, and a melt index of 20.0 g/10 min at the same weight ratio.

The tensile strength, the elongation, and the scorch time of the prepared semiconducting compound composition were measured and the results were shown in Table 1. The volume resistance of the semiconducting compound composition was measured and the results were shown in Table 2.

TABLE 1

| Composition | | Example 1 | Example 2 | Example 3 | Comparative Example 1 | Comparative Example 2 |
|---|---|---|---|---|---|---|
| | | | | Parts by weight | | |
| EBA 1 + EBA 2 mixed resin | | 100 | 100 | 100 | 100 | — |
| EBA 1 single resin | | — | — | — | — | 100 |
| Carbon black | 420B (density 0.308 g/ml) | 56.77 | — | — | — | 56.77 |
| | 2700G (density 0.299 g/ml) | — | 55.36 | — | — | — |
| | XC500 (density 0.314 g/ml) | — | — | 55.85 | — | — |
| | XC500 (density 0.347 g/ml) | | | | 55.85 | |
| Antioxidant | Super Q | 0.635 | 0.63 | 0.63 | 0.63 | 0.635 |
| Crosslinking agent | PK14 | 1.252 | 1.24 | 1.25 | 1.404 | 1.252 |
| Elongation (%) | | 192 | 192 | 186 | 192 | 180 |
| Tensile strength (kgf/cm$^2$) | | 236 | 265 | 261 | 241 | 210 |
| Scorch time (Min) | | 15.71 | 17.54 | 16.81 | 13.84 | 11.24 |

* EBA 1 is a first ethylene butyl acrylate resin, and EBA 2 is a second ethylene butyl acrylate resin.

TABLE 2

| Temperature | Example 1 | Example 2 | Example 3 | Comparative Example 1 | Comparative Example 2 |
|---|---|---|---|---|---|
| | | | Volume resistance (Ω · cm) | | |
| 30° C. | 63 | 54 | 27 | 66 | 62 |
| 60° C. | 55 | 56 | 29 | 73 | 83 |
| 90° C. | 153 | 148 | 156 | 306 | 331 |
| 110° C. | 242 | 284 | 231 | 342 | 435 |
| 135° C. | 243 | 283 | 241 | 331 | 531 |

Hereinabove, although the present invention has been described by specific matters, limited exemplary embodiments, and drawings, they have been provided only for assisting in the entire understanding of the present invention. Therefore, the present invention is not limited to the exemplary embodiments. Various modifications and changes may be made by those skilled in the art to which the present invention pertains from this description.

Therefore, the spirit of the present invention should not be limited to the described exemplary embodiments, but the claims and all modifications equal or equivalent to the claims are intended to fall within the spirit of the present invention.

The invention claimed is:

1. A semiconducting compound composition comprising:

a base resin obtained by mixing two types of ethylene butyl acrylate resins having different melt indices, the two types of ethylene butyl acrylate resins being a first ethylene butyl acrylate resin and a second ethylene butyl acrylate resin; and carbon black, wherein in the base resin, the first ethylene butyl acrylate resin is an ethylene butyl acrylate resin having a content of a structural unit derived from a butyl acrylate monomer of 15 to 18 mol % and having $MI_1$ of 5 to 10 g/10 min, the second ethylene butyl acrylate resin is an ethylene butyl acrylate resin having a content of a structural unit derived from a butyl acrylate monomer of 19 to 22 mol % and having $MI_2$ of 17 to 22 g/10 min, and wherein a content of the carbon black satisfies the following Expression 1:

$$\frac{(M_1/d_1)}{(M_1/d_1 + M_2/d_2)} \times 100 \geq 60\% \qquad \text{[Expression 1]}$$

wherein $M_1$ is a weight of the carbon black, $M_2$ is a weight of the base resin, $d_1$ is a specific gravity of the carbon black, and $d_2$ is a specific gravity of the base resin.

2. The semiconducting compound composition of claim 1, wherein the melt indices satisfy the following Expressions 2 and 3:

$$1 \leq MI_1 \leq 10 \qquad \text{[Expression 2]}$$

$$11 \leq MI_2 \leq 30 \qquad \text{[Expression 3]}$$

wherein $MI_1$ is a melt index of the first ethylene butyl acrylate resin, $MI_2$ is a melt index of the second ethylene butyl acrylate resin, the melt index is measured under conditions of 125° C. and 2.16 kg according to the ASTM D1238 measurement method, and a unit of the melt index is g/10 min.

3. The semiconducting compound composition of claim 2, wherein $MI_1$ of the first ethylene butyl acrylate resin is 5 to 10 g/10 min, and $MI_2$ of the second ethylene butyl acrylate resin is 15 to 25 g/10 min.

4. The semiconducting compound composition of claim 2, wherein $MI_1$ and $MI_2$ of the base resin satisfy the following Expression 4:

$$10 \leq MI_2 - MI_1 \leq 20 \qquad \text{[Expression 4]}$$

wherein $MI_1$ is the melt index (g/10 min) of the first ethylene butyl acrylate resin measured under conditions of 125° C. and 2.16 kg according to the ASTM D1238 measurement method, and $MI_2$ is the melt index (g/10 min) of the second ethylene butyl acrylate resin measured by the same measurement method as described above.

5. The semiconducting compound composition of claim 1, wherein the carbon black is contained in an amount of 30 to 100 parts by weight with respect to 100 parts by weight of the base resin.

6. The semiconducting compound composition of claim 1, further comprising an antioxidant and a crosslinking agent.

7. The semiconducting compound composition of claim 6, wherein the carbon black, the antioxidant, and the crosslinking agent are contained in amounts of 30 to 100 parts by weight, 0.01 to 5 parts by weight, and 0.1 to 10 parts by weight, respectively, with respect to 100 parts by weight of the base resin.

8. The semiconducting compound composition of claim 7, further comprising a metal stearate.

9. The semiconducting compound composition of claim 8, wherein the metal stearate includes one or a combination of two or more selected from the group consisting of zinc stearate, calcium stearate, aluminum stearate, and magnesium stearate.

10. A semiconducting resin cured product obtained by crosslinking the semiconducting compound composition of claim 1.

11. The semiconducting resin cured product of claim 10, wherein the semiconducting resin cured product has a volume resistance of 330 Ω·cm or less when measured at 135° C. according to ASTM D991.

12. A method of preparing a semiconducting resin cured product, the method comprising:

a) adding a base resin, carbon black, and an antioxidant to a first kneader and then performing kneading and crushing to prepare master batch particles;

b) mixing the master batch particles and a crosslinking agent so that the master batch particles are impregnated with the crosslinking agent to prepare a semiconducting compound composition; and c) homogenizing the semiconducting compound composition to provide a semiconducting resin cured product according to claim 10, wherein a content of the carbon black satisfies the following Expression 1:

$$\frac{(M_1/d_1)}{(M_1/d_1 + M_2/d_2)} \times 100 \geq 60\% \qquad \text{[Expression 1]}$$

wherein $M_1$ is a weight of the carbon black, $M_2$ is a weight of the base resin, $d_1$ is a specific gravity of the carbon black, and $d_2$ is a specific gravity of the base resin.

13. The method of claim 12, wherein the carbon black, the antioxidant, and the crosslinking agent are contained in amounts of 30 to 100 parts by weight, 0.01 to 5 parts by weight, and 0.1 to 10 parts by weight, respectively, with respect to 100 parts by weight of the base resin.

* * * * *